United States Patent
Grimm et al.

(10) Patent No.: US 10,706,880 B1
(45) Date of Patent: Jul. 7, 2020

(54) ELECTRICALLY CONDUCTIVE SOLDER NON-WETTABLE BOND PADS IN HEAD GIMBAL ASSEMBLIES

(71) Applicant: Seagate Technology LLC, Cupertino, CA (US)

(72) Inventors: Robbee Lee Grimm, Lakeville, MN (US); Greg Arthur Schmitz, Princeton, MN (US); Venkateswara Rao Inturi, Shakopee, MN (US); Aaron Michael Collins, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/372,898

(22) Filed: Apr. 2, 2019

(51) Int. Cl.
*G11B 5/48* (2006.01)

(52) U.S. Cl.
CPC ............ *G11B 5/4826* (2013.01); *G11B 5/486* (2013.01); *G11B 5/4846* (2013.01); *G11B 5/4853* (2013.01)

(58) Field of Classification Search
None
See application file for complete search history.

(56) References Cited

U.S. PATENT DOCUMENTS

| | | | |
|---|---|---|---|
| 5,650,595 A | 7/1997 | Bentlage et al. | |
| 5,767,010 A | 6/1998 | Mis et al. | |
| 6,329,605 B1 | 12/2001 | Beroz et al. | |
| 6,387,793 B1 | 5/2002 | Yap et al. | |
| 6,465,747 B2 | 10/2002 | DiStefano et al. | |
| 6,759,307 B1 | 7/2004 | Yang | |
| 6,828,677 B2 | 12/2004 | Yap et al. | |
| 7,974,044 B1 | 7/2011 | Myers | |
| 8,174,793 B2 * | 5/2012 | Hasegawa | G11B 5/105 360/234.5 |
| 8,259,415 B2 * | 9/2012 | Hutchinson | G11B 5/4853 360/234.5 |
| 8,295,011 B2 | 10/2012 | Chou | |
| 8,320,081 B2 | 11/2012 | Chou et al. | |
| 8,587,901 B1 * | 11/2013 | Puttichaem | G11B 5/4826 360/234.5 |
| 8,810,965 B2 | 8/2014 | Peng et al. | |
| 9,390,737 B1 * | 7/2016 | Puttichaem | G11B 5/4826 |
| 9,728,211 B1 * | 8/2017 | Murata | G11B 5/4826 |

(Continued)

FOREIGN PATENT DOCUMENTS

WO   WO-2012066465 A1 *   5/2012   ............. H05K 1/111

OTHER PUBLICATIONS

U.S. Appl. No. 15/788,886, filed Oct. 20, 2017.

*Primary Examiner* — William J Klimowicz
(74) *Attorney, Agent, or Firm* — Kagan Binder, PLLC

(57) ABSTRACT

A magnetic recording head is provided including a body with a trailing surface, a plurality of bond pads in a row, each of which is spaced by a gap from an adjacent bond pad along a width of the trailing surface. Each bond pad includes a base layer having a top surface, a coating layer covering at least a portion of the top surface of the base layer, two side edges spaced from each other across a width of the bond pad, wherein a width of the gap between adjacent bond pads is defined by one side edge of each of two adjacent bond pads, a top edge extending between the two side edges, and at least one solder dam comprising a nonwettable, electrically conductive material positioned adjacent to the top edge of at least one of the bond pads.

15 Claims, 3 Drawing Sheets

(56) References Cited

U.S. PATENT DOCUMENTS

| | | | |
|---|---|---|---|
| 9,773,753 B1 * | 9/2017 | Lin | ................. H01L 23/5389 |
| 9,953,669 B1 | 4/2018 | Klarqvist | |
| 10,021,781 B2 * | 7/2018 | Yamada | ............. H05K 1/0393 |
| 2002/0036100 A1 | 3/2002 | Slemmons | |
| 2005/0280946 A1 | 12/2005 | Muro | |
| 2009/0194777 A1 | 8/2009 | Murphy | |
| 2011/0193218 A1 | 8/2011 | Arvin et al. | |
| 2011/0194209 A1 | 8/2011 | Chou | |
| 2019/0122694 A1 * | 4/2019 | Davidson | ............ G11B 5/4826 |

* cited by examiner

ELECTRICALLY CONDUCTIVE SOLDER NON-WETTABLE BOND PADS IN HEAD GIMBAL ASSEMBLIES

BACKGROUND

Hard disc drive (HDD) systems typically include one or more data storage discs with concentric tracks containing information. A transducing head carried by a slider is used to read from and write to a data track on a disc, wherein each slider has an air bearing surface that is supportable by a cushion of air generated by one of the rotating discs. The slider is carried by an arm assembly that includes an actuator arm and a suspension assembly, which can include a separate gimbal structure or can integrally form a gimbal.

As the density of data desired to be stored on discs continues to increase, more precise positioning of the transducing head and other components is becoming increasingly important. In many conventional systems, head positioning is accomplished by operating the actuator arm with a large scale actuation motor, such as a voice coil motor, to position a head on a flexure at the end of the actuator arm. A high resolution head positioning mechanism, or microactuator, is advantageous to accommodate the high data density.

The precision manufacturing of components of disk drive systems includes providing an electrical connection via solder material between sliders and suspension assemblies, either or both of which may include bond pads or bonding pads. In particular, a trailing surface of a magnetic recording head can have a number of bond pads that correspond to the same number of electrical pads that are positioned on a suspension tongue, wherein the electrical pads are connected to electrical traces. The electrical connection is provided by placing solder joints between the bond pads and the electrical pads, which thereby electrically connects the magnetic recording head to the electrical traces.

Typical bond pads are both electrically conductive and solder wettable, which allows both for electrical testing during assembly (e.g., with a probe) and electrical connection with solder of bond pads with adjacent components. However, it can be difficult to control the expansion or movement of solder during its placement in a solder joint, which can lead to bridged or open connections in high connection density applications. In addition, because many bond pads are made of a material that oxidizes to create an oxidized layer on top of the bond pad, the bond pad surface must be scratched or otherwise compromised prior to being able to probe or test the device. There is therefore a desire to provide slider configurations that allow for accurate placement of solder connections in high density applications while also providing a surface that is available for electrical probing without surface scratching during and after the slider assembly process.

SUMMARY

In accordance with an aspect of the invention, a magnetic recording head is provided that includes a body comprising a trailing surface, a plurality of bond pads in a row, each of which is spaced by a gap from an adjacent bond pad along a width of the trailing surface. Each bond pad includes a base layer comprising a top surface, a coating layer covering at least a portion of the top surface of the base layer, two side edges spaced from each other across a width of the bond pad, wherein a width of the gap between adjacent bond pads is defined by one side edge of each of two adjacent bond pads, a top edge extending between the two side edges, and at least one solder dam comprising a nonwettable, electrically conductive material positioned adjacent to the top edge of at least one of the bond pads.

At least a portion of the coating layer comprises an electrically conductive and non-wettable material, which may have a low sheet resistance that allows for a contact probe to have low surface resistance for electrical testing without modifying a top surface of the coating layer. At least a portion of the coating layer may be a material comprising an electrical conductivity similar to an electrical conductivity of gold, and may include an alloy of Ruthenium (Ru) and Titanium (Ti). Such an RuTi alloy may include a range of 60 percent Ruthenium and 40 percent Titanium to 70 percent Ruthenium and 30 percent Titanium.

In embodiments, the percentage of a surface area of the top surface of the base layer that is covered with the coating layer is in a range of 10% to 90%, inclusive, or can more particularly be in a range of 20% to 60%, inclusive, or can even more particularly be in a range of 30% to 40%, inclusive.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

The methods and features described herein are applicable to the area where there is an operative connection between a slider and a head suspension assembly. This area typically includes the provision of a gimbal or flexure element for permitting the slider to move at least along pitch and roll axes relative to the presentation of the slider to a spinning disk The gimbal or flexure can be created integrally with the head suspension assembly or as a separate component and attached to the head suspension assembly. In either case, the gimbal or flexure includes a slider bond pad to which the slider is attached for controlled movement of the slider as it flies over the media surface of a spinning disk. Such a head slider typically includes a trailing edge having a series of bond pads in a row over a portion of the trailing edge.

The bond pads described herein are provided for electrical connection to the many transducer devices and other devices of a developed slider design, including contacts for read and write transducers, read and write heaters bolometers, and/or laser elements as may be provided for operation of a head slider. Certain functional elements of such a slider require positive and negative bond pads for electrical operation, while others require a single bond pad for electrical operation. These bond pads are conventionally electrically connected with wires or conductor elements that are typically provided to extend along the supporting head suspension assembly for controlled operation of each of the functional elements of the head slider.

Figure 1:
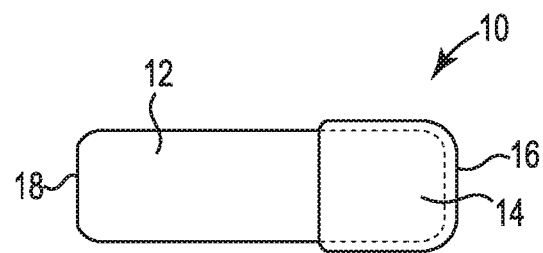
FIG. 1 is an enlarged top view of an exemplary bond pad with an electrically conducting and solder non-wettable bond pad portion at one end.
Figure 2:
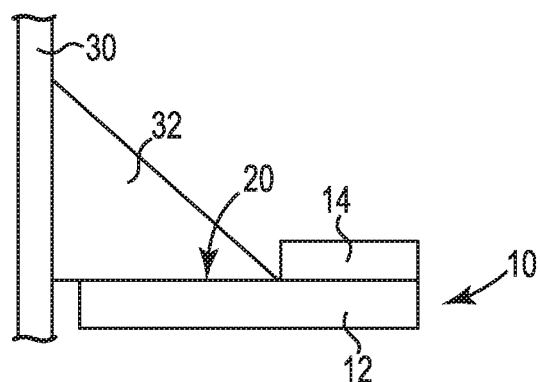
FIG. 2 is an enlarged schematic side view of an exemplary bond pad of the type illustrated in FIG. 1, as positioned relative to the trailing edge of a magnetic recording head and a suspension layer or pad, and including an exemplary solder joint.

Referring now to the Figures, and initially to FIG. 1, a bond pad 10 is illustrated, which includes a base layer 12 with a first end 16 and a second end 18. The illustrated base layer 12 is a conductive and solder wettable material, such as gold, for example. The shape of the base layer 12 is shown as an elongated rectangular member, although the shape can instead be square, circular, oval, elliptical, triangular, irregular, or another shape. And although base layer 12 is illustrated as a single layer, it can instead comprise multiple layers, as will be described relative to an embodiment below. In any case, relative to the present discussion of bond pad 10, base layer 12 is the only layer or the uppermost layer of a stack of materials, and includes a top or outermost surface 20, as shown in FIG. 2.

At least a portion of base layer 12 at the first end 16 is coated or covered with a coating layer 14. The percentage of the surface area of the base layer 12 that is covered with the coating layer 14 can vary considerably, such as in a range of 10% to 90%, inclusive, and more preferably in a range of 20% to 60%, inclusive, and more preferably in a range of 30% to 40%, inclusive. In any case, the percentage of the base layer 12 that is covered with coating layer 14 should provide a surface area that is large enough for a probe tip to contact it, and therefore is at least partially impacted by the size of the probe tip being used. In embodiments of the bond pad, the overall pad size can be customized for multiple probe platforms and probe tip sizes.

At least a portion of coating layer comprises a material that is electrically conductive and non-wettable to solder, such as an alloy of Ruthenium and Titanium (RuTi) or another material having a low sheet resistance that allows for a contact probe to have low surface resistance for electrical testing without requiring that its surface be scratched or otherwise compromised. In an embodiment, the material can have electrical conductivity that is the same or similar to that of gold. In other words, the RuTi layer will provide an outer surface that has low resistivity. In this way, the bond pad is provided with a top surface with both solder wettable and solder non-wettable regions, while most or all of the surface is electrically conductive.

Figure 5:
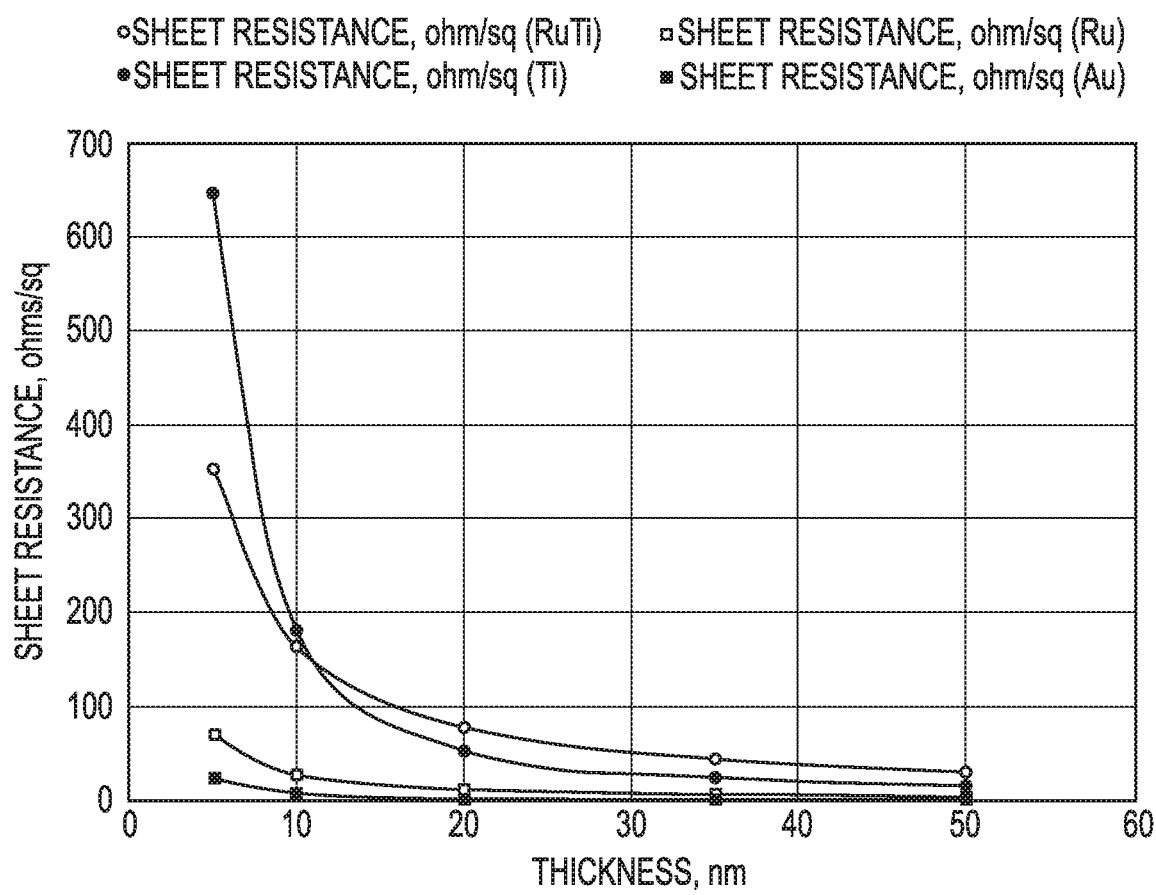
FIG. 5 is a graph illustrating sheet resistance variation for various films versus thickness.

Referring now to FIG. 5, a graph is provided that illustrates sheet resistance variation for various films versus thickness used for coating layers provided herein. That is, the sheet resistances of various relevant films are measured with varying thicknesses. As shown, Au films have the smallest change or difference in resistance with varying thicknesses. Ru films have a slightly larger change in resistance with varying thicknesses, while RuTi films have a larger change in resistance with variations in thickness, and Ti films have the largest change in resistance with varying thicknesses of the materials tested. The relatively large change in resistance for Ti from 10 nm to 5 nm is at least partially attributed to Ti oxidation affinity on the surface. The change in resistance in general is at least partially due to the fact that as the film gets thinner, the surface oxide film portion will be higher and cause a significant change in sheet resistance. Since oxidation is difficult in Au film, the resistance change is also minimal and vice versa. In accordance with the invention, in order to balance probability (measurability of electrical resistance) and wettability of bond pads, a material that combines noble and readily oxidizable material is utilized (e.g., RuTi). In some embodiments, a sheet resistance value of less than 50 ohms/sq. is utilized to achieve desired probing results.

For the coating layers that are provided as an alloy of Ruthenium and Titanium, as discussed herein, the amount of each material can vary in the alloy. As one example, the relative proportion of materials for an RuTi alloy can be in the range of 10 percent Ruthenium and 90 percent Titanium to 90 percent Ruthenium and 10 percent Titanium. However, it has been found that a range of 60 percent Ruthenium and 40 percent Titanium to 70 percent Ruthenium and 30 percent Titanium can be preferred in some applications When the coating layer is RuTi and is exposed to oxygen (e.g., air, $O_2$, $O_3$), its outer surfaces will oxidize. Because this oxidized outer layer will be electrically conductive, however, it will not be necessary to scratch its surface to electrically probe its surface. In this way, a "low contact force probe" or "contact" probe can be used. Further, with the use of such a coating layer, the probe tip can include a wide variety of shapes since a particular scratching or modification of the surface of the bond pad by the probe tip or another device will not be required.

FIG. 2 is a schematic side view of an exemplary bond pad 10 of the type illustrated in FIG. 1, as positioned relative to the trailing edge of a suspension layer or pad 30, and including an exemplary solder joint 32. As shown, electrical pad 30 is positioned adjacent to a corresponding bond pad 10. In order to electrically connect the electrical pads 30 to the bond pads 10, solder joint 32 is provided for each pair of a bond pad 10 and electrical pad 30. Although only one of such solder joints 32 is illustrated in this figure, it is understood that each pair of pads 10, 30 can include a solder joint 32 that provides an electrical connection between components.

As described above, bond pad 10 further includes the coating layer 14 at one end that is non-wettable such that it will essentially repel or prevent wetting of solder that contacts it during the solder application process (although it is understood that it can extend above the bond pad such that it would have a contact angle greater than 90 degrees). That is, coating layer 14 will prevent the material of the solder joint 32 from spreading or extending beyond the edge of the uncoated portion of the wettable base layer 12. The coating layers 14 used herein can be configured so that particularly designed or chosen wetting areas will be provided on perpendicularly arranged surfaces that restrict the expansion of the solder material within certain parameters. In this way, certain predetermined shapes and sizes for the solder joints can be provided. Thus, when a solder ball or another solder configuration is applied to the bond area, the coating layer 14 will constrain the solder material from moving too far toward any ELG bond pads or other features on the ABS surface of the slider.

Figure 3:
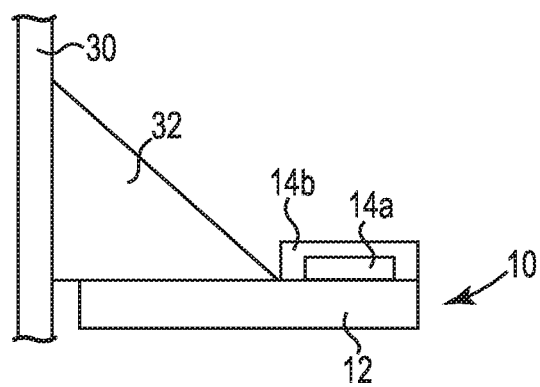
FIG. 3 is an enlarged schematic side view of an exemplary bond pad of the type illustrated in FIG. 1, as positioned relative to the trailing edge of a magnetic recording head and a suspension layer or pad, and including an exemplary solder joint.

In FIG. 2, the coating layer 14 is shown as a single layer composition, such as the RuTi material described above, which is electrically conductive and solder non-wettable. FIG. 3 illustrates a similar configuration, but the coating layer 14 is shown instead as a base portion 14a and an outer oxidized layer 14b, wherein the outer oxidized layer 14b is electrically conductive and solder non-wettable.

A head slider as described herein can be positioned relative to a portion of a typical disk drive. Such a disk drive can include at least one magnetic storage disk configured to rotate about an axis, an actuation motor (e.g., a voice coil motor), an actuator arm, a suspension assembly that includes a load beam, and the head slider carrying a transducing or read/write head. Slider is supported by a suspension assembly (e.g., a suspension tongue of the suspension assembly) which in turn is supported by actuator arm. Together, actuator arm, suspension assembly and slider form a head stack assembly (HSA). The actuation motor is configured to pivot the actuator arm about an axis in order to sweep the suspension and attached slider in an arc across a surface of rotating disk with slider "sliding" or "flying" across the disk on a cushion of air, often referred to as an air bearing. The read/write head carried by slider can be positioned relative to selected concentric data tracks of the disk by a piezoelectric microactuator, for example. A stack of co-rotating disks can be provided, with additional actuator arms, suspension assemblies, and sliders carrying read/write heads for reading and writing at top and bottom surfaces of each disk in the stack, as desired for a particular configuration.

Another set of bond pads can be provided for utilization during the fabrication process of a head slider from a wafer or fabricated substrate, as opposed to the operative use of bonding pads for slider elements during operation of a disk drive. This additional set of bond pads is generally provided to allow for temporary positive and negative electrical connection of electrical lapping guides (ELGs) during slider fabrication processes. As such, pairs of bond pads can be used as ELG pads for ELG monitoring during slider processing. Multiple pairs of bond pads and ELGs can be utilized during fabrication.

Figure 4:
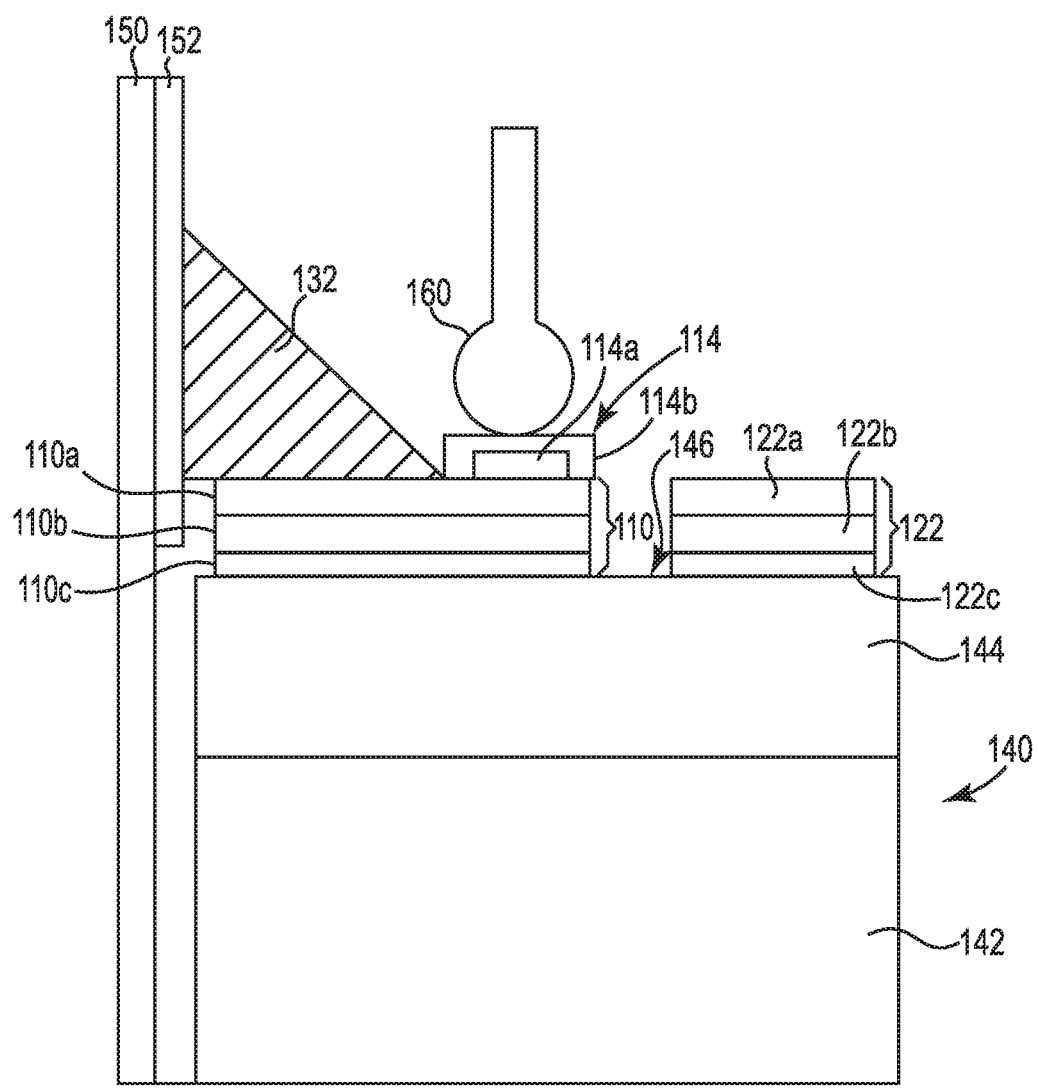
FIG. 4 is a schematic side view of exemplary layers on a magnetic recording head electrically connected to a suspension with a solder joint and including a layer of material that is both electrically conductive and solder non-wettable.

One configuration of a construction utilizing bond pads 110 that include electrically conductive and solder non-wettable portions on a slider 140 is schematically illustrated in FIG. 4. As shown, slider 140 may be constructed of one or more layers of material, such as an aluminum-titanium carbon (AlTiC) alloy base portion 142 with a top alumina layer 144. Slider 140 includes a trailing edge 146 that is generally perpendicular to a suspension member 150 to which it is mounted. Suspension member 150 includes a suspension layer or pad 152, which may be made of gold, for example. Trailing edge 146 includes bond pads 110 and bond pads 122 (which may be an ELG, as discussed above), both of which have multi-layered constructions, wherein more or less layers than shown are contemplated herein. In this exemplary embodiment, however, the bond pads 110, 122 have the same three layers, including layers 110a, 122a that may be a gold layer, layers 110b, 122b that may be a nickel layer, and layers 110c, 122c that may be a chromium layer. Coating layer 114 is applied on top of layer 110a of the bond pad 110 so that it extends above the outer surface of the layer 110a. These materials and the illustrated thicknesses of the various layers are only exemplary, and it is understood that many variations of materials and layer thicknesses can be used in accordance with the invention.

Coating layer 114 is a non-wettable material such that when solder is applied to the area between the suspension pad 152 and the bond pad 110, a solder joint 132 is formed that will be "blocked" from extending into the area of the coating layer 114, both by the material from which the coating layer 114 is made and the physical obstruction of the coating layer 114 that may not be flush with the top surface of the bond pad 110. The coating layer 114 may be made of a material such as an alloy of Ruthenium and Titanium (RuTi), as discussed above, which is also electrically conductive such that a contact probe 160 can contact its upper surface for electrical testing purposes. Coating layer 114 is illustrated as including a base portion 114a and an outer oxidized layer 114b, wherein the outer oxidized layer 114b is electrically conductive and solder non-wettable.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A magnetic recording head comprising:
a body comprising a trailing surface;
a plurality of bond pads in a row, each of which is spaced by a gap from an adjacent bond pad along a width of the trailing surface, wherein each bond pad comprises:
a base layer comprising a top surface;
a top edge defining a width of the bond pad;
at least one solder dam comprising a coating layer covering at least a portion of the top surface of the base layer, wherein the at least one solder dam comprises a nonwettable, electrically conductive material positioned adjacent to the top edge of at least one of the bond pads; and
two side edges spaced from each other across the width of the bond pad, wherein a width of the gap between adjacent bond pads is defined by one side edge of each of two adjacent bond pads
wherein at least a portion of the coating layer comprises an alloy of Ruthenium (Ru) and Titanium (Ti).

2. The magnetic recording head of claim 1, wherein at least a portion of the coating layer comprises a low sheet resistance that allows for a contact probe to have low surface resistance for electrical testing without modifying a top surface of the coating layer.

3. The magnetic recording head of claim 1, wherein at least a portion of the coating layer comprises a material comprising an electrical conductivity the same as an electrical conductivity of gold.

4. The magnetic recording head of claim 1, wherein the alloy of Ruthenium and Titanium comprises a range of 60 percent Ruthenium/40 percent Titanium to 70 percent Ruthenium/30 percent Titanium.

5. The magnetic recording head of claim 1, wherein the percentage of a surface area of the top surface of the base layer that is covered with the coating layer is in a range of 10% to 90%, inclusive.

6. The magnetic recording head of claim 5, wherein the percentage of the surface area of the top surface of the base layer that is covered with the coating layer is in a range of 20% to 60%, inclusive.

7. The magnetic recording head of claim 6, wherein the percentage of the surface area of the top surface of the base layer that is covered with the coating layer is in a range of 30% to 40%, inclusive.

8. The magnetic recording head of claim 1, wherein the at least one solder dam comprises a plurality of solder dams, and wherein one of the plurality of solder dams is positioned adjacent to the top edge of each of the plurality of bond pads.

9. A head gimbal assembly, comprising:
a suspension comprising multiple electrical pads; and
a magnetic recording head comprising:
   a body comprising a trailing surface;
   a plurality of bond pads in a row, each of which is spaced by a gap from an adjacent bond pad along a width of the trailing surface, wherein each bond pad comprises:
     a base layer comprising a top surface;
     a top edge defining a width of the bond pad;
     at least one solder dam comprising a coating layer covering at least a portion of the top surface of the base layer, wherein the at least one solder dam comprises a nonwettable, electrically conductive material positioned adjacent to the top edge of at least one of the bond pads; and
     two side edges spaced from each other across the width of the bond pad, wherein a width of the gap between adjacent bond pads is defined by one side edge of each of two adjacent bond pads; and
   at least one solder joint having a top edge adjacent to the at least one solder dam, wherein each solder joint electrically connects one of the bond pads to one of the electrical pads of the suspension,
wherein at least a portion of the coating layer comprises an alloy of Ruthenium (Ru) and Titanium (Ti).

10. The head gimbal assembly of claim 9, wherein at least a portion of the coating layer comprises a low sheet resistance that allows for a contact probe to have low surface resistance for electrical testing without modifying a top surface of the coating layer.

11. The head gimbal assembly of claim 9, wherein at least a portion of the coating layer comprises a material comprising an electrical conductivity the same as an electrical conductivity of gold.

12. The head gimbal assembly of claim 9, wherein the alloy of Ruthenium and Titanium comprises a range of 60 percent Ruthenium/40 percent Titanium to 70 percent Ruthenium/30 percent Titanium.

13. The head gimbal assembly of claim 9, wherein the percentage of a surface area of the top surface of the base layer that is covered with the coating layer is in a range of 10% to 90%, inclusive.

14. The head gimbal assembly of claim 13, wherein the percentage of the surface area of the top surface of the base layer that is covered with the coating layer is in a range of 20% to 60%, inclusive.

15. The head gimbal assembly of claim 14, wherein the percentage of the surface area of the top surface of the base layer that is covered with the coating layer is in a range of 30% to 40%, inclusive.

* * * * *